Feb. 16, 1971    R. I. VAN NICE    3,564,470
ELECTRICAL WINDING STRUCTURES
Filed April 16, 1969    2 Sheets-Sheet 1

WITNESSES
Theodore F. Wrobel
James F. Young

INVENTOR
Robert I. Van Nice
BY
Donald R. Lackey

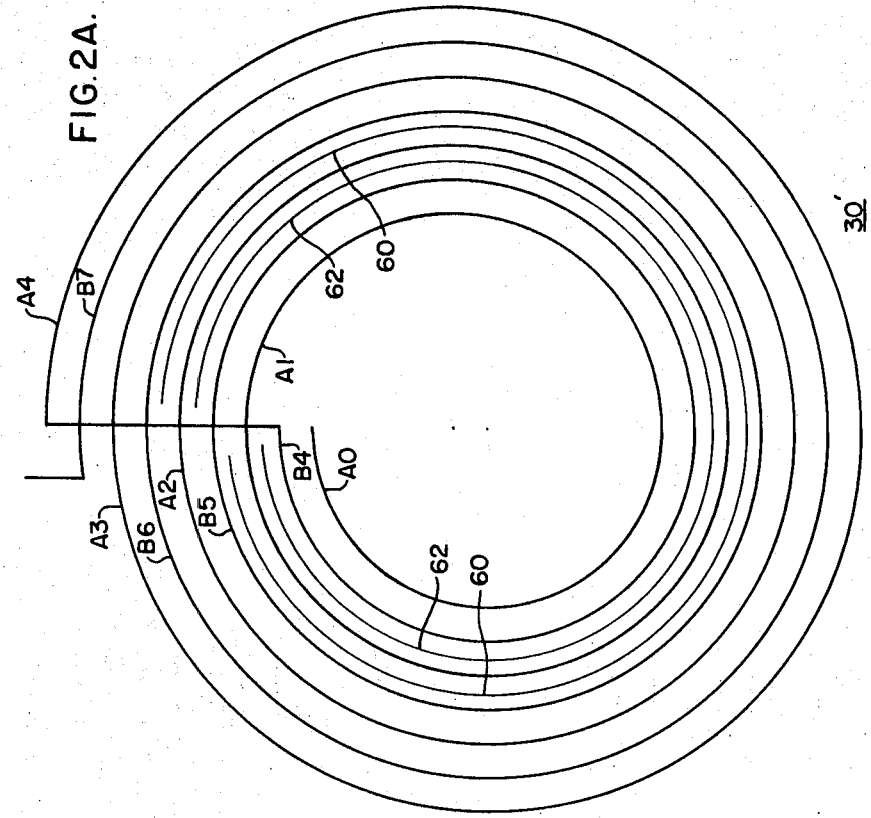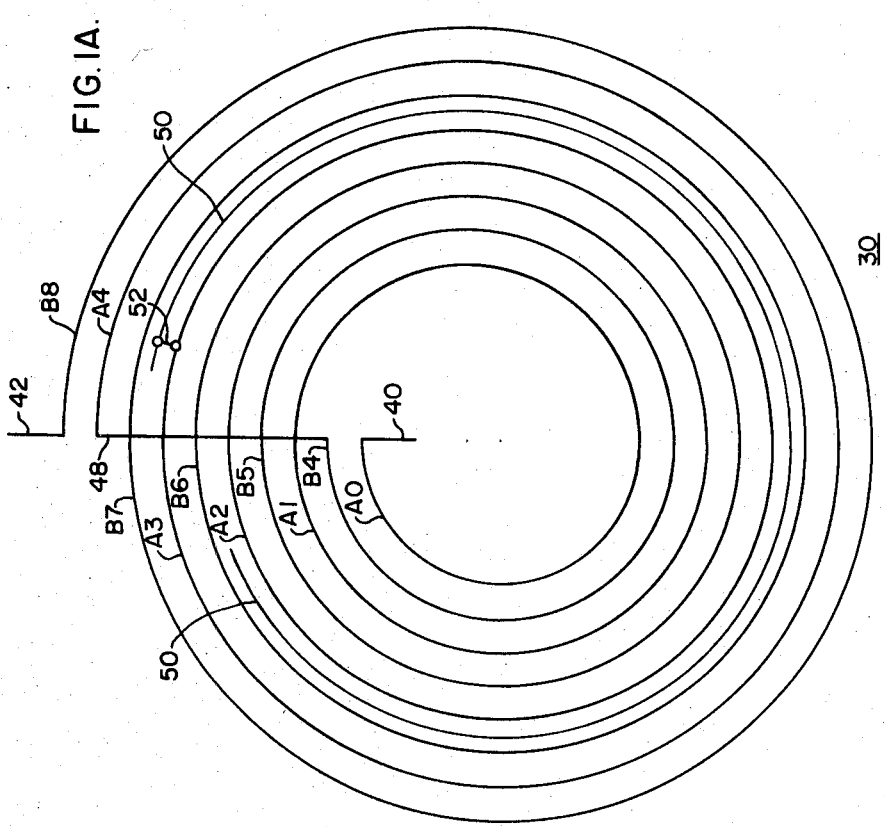

United States Patent Office 3,564,470
Patented Feb. 16, 1971

3,564,470
ELECTRICAL WINDING STRUCTURES
Robert I. Van Nice, Sharon, Pa., assignor to Westinghouse Electric Corporation, Pittsburgh, Pa., a corporation of Pennsylvania
Filed Apr. 16, 1969, Ser. No. 816,539
Int. Cl. H01f 15/14, 27/08
U.S. Cl. 336—60               10 Claims

ABSTRACT OF THE DISCLOSURE

An electrical winding having a plurality of pancake coils of the interleaved turn, high series capacitance type. Electrically conductive means is disposed between predetermined turns of at least certain of the pancake coils, to provide the desired coil outside diameter, or to provide cooling ducts between the turns of the coil, or both. The electrically conductive means provides these functions without introducing discontinuities into the desired predetermined capacitive structure of the pancake coils.

BACKGROUND OF THE INVENTION

The invention relates in general to electrical inductive apparatus, such as power transformers, and more specifically to winding structures for electrical inductive apparatus of the core-form type.

Power transformers of the core-form type commonly have a high voltage winding formed of a plurality of disc or pancake type coils, which are connected in electrical series, and stacked in side-by-side spaced relation with their openings in alignment. In order to distribute surge potentials and other transient voltages, such as those due to lightning and switching, more uniformly across the high voltage winding, it is common to increase the through or series capacitance of the winding by a construction known in the art as interleaving. The process of interleaving separates physically connected conductor turns of the pancake coils of the winding by conductor turns from an electrically distant portion of the winding. Many different interleaving arrangements are known in the art, with the basic concept being to radially wind the pancake coils to provide two or more separate coil sections, the turns of which are radially interleaved with one another. Then, the sections are electrically interconnected within each coil, between adjacent coils, or both, to place turns from a different electrical portion of the coil or winding between physically connected turns. U.S. Pat. No. 3,090,022, issued May 14, 1963, and U.S. Pat. No. 3,246,270, issued Apr. 12, 1966, both of which are assigned to the same assignee as the present application, disclose examples of known interleaving arrangements.

It is important to maintain a uniform capacitive structure across each of the pancake coils, as any discontinuity or irregularity in the capacitive structure will cause surge voltages to be non-uniformly distributed across the pancake coil, and the discontinuities or changes in capacitance may initiate voltage oscillations of substantial magnitude.

In order to adequately brace the pancake coils of a winding, it is preferable that all of the pancake coils have substantially the same outside diameter. Since some of the pancake coils of the winding may have a different number of turns than other pancake coils of the winding, or use a different size conductor, or have a different amount of electrical insulation between their turns, it is common to place filler strips formed of pressboard or other insulating material, between the turns of certain of the pancake coils, in order to increase their diameter to substantially match the diameter of large coils in the winding. It has been found, however, that these filler strips weaken a pancake coil mechanically, due to the shrinkage of the filler strips during the subsequent processing steps of the transformer. Further, it has been found that the pressboard strips reduce the capacitive coupling between adjacent turns, and they upset the desired uniformity of the capacitance across the pancake coil. This results in a more non-linear distribution of a surge potential across a pancake coil, increasing the voltage stresses from coil to coil, from turn-to-turn, from the pancake coils to ground, and between the pancake coils and any top-to-bottom conductors, such as interleaving connections and finish-start interpancake connections.

In addition to filler strips, certain types of power transformers have cooling ducts provided between predetermined turns at spaced locations across the coil build dimension, with these cooling ducts being formed by duct forming members formed of an insulating material such as pressboard, which have a corrugated or wavy cross-sectional configuration. These duct forming members create the same mechanical and electrical problems as hereinbefore described relative to the filler strips, and in addition may collapse during the mechanical stresses created by a short circuit, allowing the pancake coil to collapse radially.

Therefore, it would be desirable to be able to increase the outside diameter of the high series capacitance interleaved turn type pancake coil, and/or provide cooling ducts between predetermined adjacent turns thereof, without deleteriously affecting the uniform high series capacitive structure resulting from the interleaving arrangement employed, and without weakening the pancake coil mechanically.

SUMMARY OF THE INVENTION

Briefly, the present invention is a new and improved winding structure having a plurality of pancake coils of the interleaved turn, high series capacitance type, wherein dimensional spacers or filler strips, and cooling duct formers, when required, are formed of a metallic conductor rather than pressboard or other insulating material. The metallic spacer strips and duct formers are much stronger mechanically than the insulating filler strips and insulating duct formers of the prior art, and in addition possess the advantage of maintaining the desired uniform capacitive structure across a pancake coil.

Metallic filler strips and duct formers provide close electrical coupling between the turns that they interleave, which substantially reduces the magnitude of stress concentrations in the pancake coil, compared with similar coils and windings which use insulating spacers and insulating duct formers. The close capacitive coupling between the metallic filler strips and duct formers and their adjacent turns assures that the potential of the metallic filler strips and duct formers will be close to that of the adjacent turns, which simplifies the insulating of these metallic members, and assures that partial discharges or corona will not be initiated therefrom. If desired, the metallic spacers and duct formers may be electrically connected to an adjacent conductor turn of the pancake coil, to clamp the voltage of the metallic filler strips and duct formers to that of an adjacent turn.

BRIEF DESCRIPTION OF THE DRAWINGS

Further advantages and uses of the invention will become more apparent when considered in view of the following detailed description and drawings, in which:

FIG. 1A is a schematic diagram of one of the pancake coils of the winding structure shown in FIG. 1 which more clearly illustrates the teachings of the invention;

FIG. 2A is a schematic diagram of one of the pancake coils of the winding structure shown in FIG. 2;

DESCRIPTION OF THE PREFERRED EMBODIMENTS

The invention relates to improving the surge voltage distribution characteristics and mechanical strength of electrical windings having a plurality of serially connected pancake type coils, the conductor turns of which are interleaved to provide a high series capacitance. Any type of interleaving arrangement may be used, with an example of a suitable interleaving arrangement being shown in FIG. 1.

Figure 1:
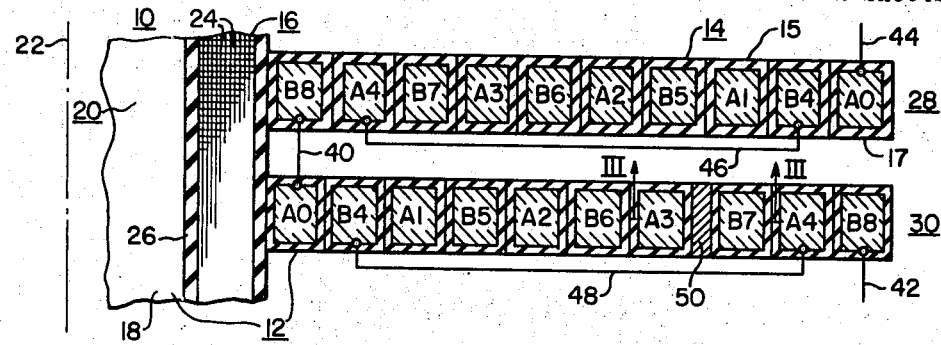
FIG. 1 is a partial sectional elevation of the magnetic core and winding structure of a transformer constructed according to the teachings of the invention.

FIG. 1 is a partial sectional elevation of a magnetic core-winding assembly 12 of a transformer 10 constructed according to an embodiment of the invention. The magnetic core-winding assembly 12 includes high and low voltage windings 14 and 16, respectively, concentrically disposed about a leg 18 of a magnetic core assembly 20, in what is commonly referred to as core-form construction Transformer 10 may be either single or polyphase, with only one phase being illustrated in order to simplify the drawings. Transformer 10 may be of the isolated winding type or of the autotransformer type, as required by a specific application. The high and low voltage windings 14 and 16, respectively, are concentrically or coaxially disposed relative to an axis or center line 22, with the windings only being shown on one side of the center line 22, as their views on the other side would be similar. Low voltage winding 16 may be of any conventional type, having a plurality of conductor turns 24 which are insulated from the magnetic core and the high voltage winding 14 by insulating means 26.

High voltage winding 14 includes a plurality of pancake or disc type coil sections, such as pancake coils 28 and 30. It is to be understood that the invention applies to windings having any plurality of pancake coils, with the pancake coils having any desired number of conductor turns.

In general, each of the pancake coils, such as pancake coil 28, includes a plurality of conductor turns spirally wound about an opening for receiving winding leg 18 of magnetic core 20 and low voltage winding 16, forming a substantially disc shape having first and second outer major opposed surfaces 15 and 17, respectively, and a predetermined radial build or outside diameter. The various pancake coils are stacked with their openings in alignment, with their major surfaces in spaced parallel relation with one another, to form cooling ducts between the adjacent coils. The plurality of pancake coils are electrically connected in series, with either start-start, finish-finish connections, as shown in FIG. 1, wherein the "start" of pancake coil 28 is connected to the "start" of pancake coil 30, via conductor 40, and the "finish" of pancake coil is connected to the "finish" of the next pancake coil via conductor 42. Or, the plurality of pancake coils may be serially connected using finish-start connections. As used in this specification, the "start" of a pancake coil is always the end of one of its inner turns, and the "finish" of a coil is always the end of one of its outer turns, regardless of where the electrical circuit first enters the pancake coil.

The magnetic core-winding assembly 12 may be disposed in a suitable casing or tank (not shown), which may be filled to a predetermined level with a fluid insulating and cooling medium, such as oil or $SF_6$.

In the embodiment of the invention shown in FIG. 1, the pancake coils 28 and 30 are singly interleaved, with the insulation between the conductor turns of pancake coils 28 and 30 being of different thicknesses, which is an example of a construction which would cause two pancake coils having the same number of turns of like dimensioned conductor, to have different outer diameters. This "grading" of the conductor turn insulation from pancake coil to pancake coil, and its purpose is described in detail in U.S. Pat. 3,246,270, which is assigned to the same assignee as the present application. As hereinbefore stated, it is desirable to maintain the outer diameters of the pancake coils of a winding substantially the same, so that there will be no unsupported portions of the pancake coils which could move and deform during short circuit stresses. This embodiment of the invention discloses how the diameter of the smaller pancake coils may be increased, without weakening the structure mechanically and without upsetting the desired capacitive structure of the coil, in order to substantially match the diameters of the pancake coil across the winding structure.

More specifically, pancake coil 28 is of the single interleaved construction, having two coil sections, which will be called the A and B sections, with the turns of the two coil sections being radially interleaved. The winding circuit, in this instance, enters the "finish" end of one of the two coil sections via conductor 44, such as the end of the A section, and it spirals inwardly appearing at every other turn, with the turns of the A section being indicated with the letter A and a number which denotes the number of turns from the point where the circuit first enters the pancake coil. Upon reaching the end of the inner turn of the A section at turn A4, the circuit returns via interleaving connection 46 to the finish end of the other coil section, which in this instance is the B section, and the circuit again spirals inwardly appearing at every other turn until reaching the end of the inner turn B8.

The series circuit through winding 14 then proceeds to the next adjacent pancake coil 30 via start-start connection 40, and it may enter the inner or start end of either of the two coil sections which make up pancake coil 30. In this instance, the circuit enters the end of the innermost turn, which will be called the A section, and it spirals outwardly in the same circumferential direction that the circuit spiraled inwardly in the coil sections of pancake coil 28, until reaching the end of turn A4. It then returns to the start or inner end of the other coil section via conductor 48, and the circuit again spirals outwardly until reaching the end of turn B8, at which point the circuit leaves pancake coil via conductor 42.

The built dimensions or outside diameters of pancake coils 28 and 30 are substantially the same, even though the dimension of the insulation between conductor turns in pancake coil 30 is less than the dimension of the insulation between the conductor turns in pancake coil 28. This is due to electrically conductive means 50, which in this instance is disposed between turns B7 and A3, as shown in the cross-sectional view of pancake coil 30 shown in FIG. 1, and which is sized to give pancake coil 30 the desired outside diameter. Since, in this embodiment, the electrically conductive means 50 is used to increase the diameter of pancake coil 30, it will be referred to as a metallic filler strip in the specification.

Unlike the filler strips of the prior art, the filler strip 50 is formed of an electrically conductive matallic material, such as aluminum or copper, and is selected to have a thickness dimension which will enable pancake coil 30 to have an outside diameter which is substantially the same as the outside diameter of pancake coil 28.

As illustrated more clearly in FIG. 1A, which is a schematic diagram of pancake coil 30, the filler strip 50 does not exceed one turn in length. This is important, as the filler strip 50 must not act like a shield. In other words, it is important that the filler strip 50 have a voltage which is substantially the same as its adjacent conductor turns. This is unlike the principles of shielding, wherein a substantially different voltage is imported from another section of the winding between predetermined adjacent turns, via an electrically conductive strip or shield. The metallic filler strip 50 must maintain the capacitive structure of the pancake coil without a substantial change, and it must accomplish this function without weakening the coil mechanically. Therefore, the purpose, construction, and results of the metallic filler strip, are entirely different than the purposes, construction, and results of a shielding conductor. In shielding, a non-power current carrying conductor is used to force a different capacitive result, by applying a voltage from an electrically distant part of the winding, between predetermined conductor turns. In this invention, by restricting the maximum lengths of the filler strip to one conductor turn, the close capacitive coupling between this single turn and its adjacent power conductor turns will cause it to assume about the same potential as the adjacent turns. If desired, filler strip 50 may have a single electrical connection to one of its adjacent turns, such as via electrical conductor 52 which is connected to turn A3, as illustrated in FIG. 1A, which clamps the voltage of the filler strip 50 to that of turn A3 and prevents the conductive filler strip 50 from assuming a potential during transient conditions which may be substantially different than its adjacent turns.

Since filler strip 50 has substantially the same potential as its adjacent turns, it may be uninsulated, as the coil turns themselves are insulated, or if desired, it may be electrically insulated. For example, it may have a thin coating of insulating enamel disposed thereon, such as an epoxy or polyester resin type enamel.

The metallic filler strip 50, being at substantially the same potential as the turns it interleaves, does not affect the high series capacitance of the structure provided by the specific interleaving arrangement employed. Thus, a surge potential is distributed across the pancake coil in substantially the same manner as for a similar pancake coil which has all of its adjacent insulated turns in contact with one another. Further, the metallic filler strip 50 is not adversely affected by the subsequent processing steps in the manufacture of the electrical apparatus, with the filler strip 50 maintaining its shape and mechanical strength to provide a pancake coil which is as strong as a tightly wound similar coil which has not been modified by the addition of filler strips.

Figure 2:
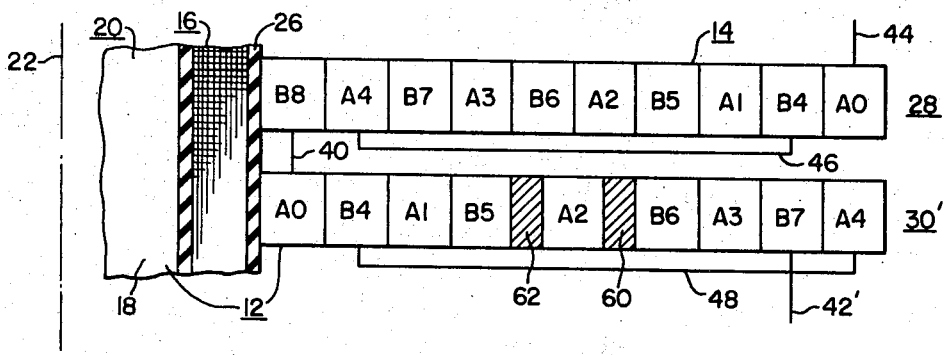
FIG. 2 is a partial sectional elevation of a magnetic core and winding structure of a transformer constructed according to another embodiment of the invention.

FIG. 2 is a partial sectional elevational view of the transformer 10 shown in FIG. 1, with the pancake coil 30 of FIG. 1 being modified to have one less turn than it had in FIG. 1. This is an example of another construction which provides pancake coils of different outside diameters. The modified pancake coil is given the reference numeral 30' in FIG. 2, in order to indicate the modification, with like reference numerals in FIGS. 1 and 2 indicating like components.

Specifically, the B section of pancake coil 30' has one fewer turn than the B section of pancake coil 30 in FIG. 1, thus requiring the diameter of pancake coil 30' to be increased by a greater amount than in FIG. 1, in order to attain the same outside diameter as pancake coil 28. Thus, instead of adding a single filler strip to the coil build, two filler strips 60 and 62 have been incorporated in pancake coil 30', between predetermined selected conductor turns. While FIG. 2 illustrates two filler strips being utilized, it is to be understood that any number of filler strips may be used, but as shown in FIG. 2A which is a schematic diagram of pancake coil 30', each filler strip utilized should not exceed a single conductor turn in length, and they should not be electrically connected to one another. Each of the filler strips 60 and 62 may be unconnected or "floating," or they may each be physically electrically connected to one of their adjacent turns, in a manner similar to the physical connection of filler strip 50 to its adjacent conductor turn, as illustrated in FIG. 1A.

The filler strips 60 and 62 being metallic, form additional capacitor plates in the capacitive structure of pancake coil 30', which are at substantially the same voltage as their adjacent conductor turns, thus enabling the coil build dimension to be increased without introducing substantial discontinuities into the capacitive structure which may cause increased voltage stresses and oscillations. Further, the increase in the build dimension of the pancake coil is accomplished without weakening the coil mechanically. If desired, the same insulated conductor used for carrying power current may be used as a filler strip; or, since the filler strips do not carry power current, they may have a substantially smaller cross sectional area, with the thickness dimension of each filler strip being selected to provide the desired incremental increase in the radial build dimension of the coil.

In addition to filler strips for the specific function of increasing the desired radial build of a pancake coil, certain types of high voltage windings for power transformers of the core-form type have a plurality of duct forming members disposed at spaced intervals across the coil build, between predetermined turns thereof. For example, power transformers which utilize force fluid cooling generally have such ducts. In the prior art, these duct forming members are formed of corrugated insulating material, such as pressboard. Insulating materials disposed in oil have a tendency to become brittle with age, thus losing their mechanical strength. A short circuit may therefore impose stresses on the pancake coils which may cause the corrugated insulating duct forming members to collapse, resulting in a radial collapse of the pancake coils. Further, when these insulating ducts are applied to the interleaved turn high series capacitance type pancake coils, the insulating ducts reduce the series capacitance of the pancake coils, which results in increased voltage stresses during a surge potential. The discontinuity in the otherwise uniform capacitive structure, may also cause voltage oscillations during a surge or transient voltage condition.

Figure 3:
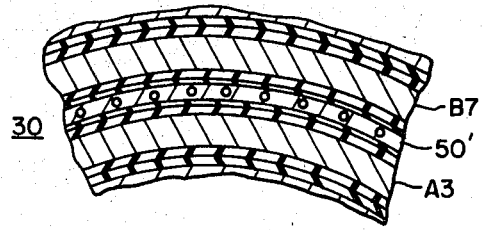
FIG. 3 is a cross-sectional view of two turns of one of the pancake coils shown in FIG. 1, taken in the direction of arrows III—III, which illustrates another embodiment of the invention.

The teachings of this invention enables cooling ducts to be created between predetermined turns of pancake coils, while obviating the disadvantages of the prior art. FIG. 3 is a fragmentary cross-sectional view of the pancake coil 30 shown in FIG. 1, taken in the direction of arrows III—III, with the filler strip 50, instead of being solid, having a modified construction which provides the function of a duct forming member. The modified filler strip 50 is given the reference numeral 50' in FIG. 3, to indicate the modification to its structure, with the remaining like reference numerals in FIGS. 1 and 3 indicating like components.

Figure 4:
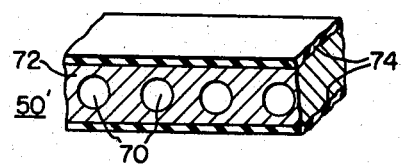
FIG. 4 is a perspective view of a metallic duct former shown in FIG. 3, which is constructed according to the teachings of the invention.

The duct forming member 50' may be constructed in any suitable manner such as illustrated more clearly in FIG. 4, which is a fragmentary, perspective view of the duct forming member 50' shown in FIG. 3. The duct forming member 50' has a plurality of spaced openings 70 disposed through a strip 72 of electrically conductive material, such as aluminum. The openings are disposed in the duct forming member 50' such that when the duct former is disposed between adjacent turns of the pancake coil, the openings 70 extend between or in communication between the first and second major opposed surfaces of the pancake coil. If desired, the metallic duct forming member 50' may have a thin coating 74 of electrical insulation disposed thereon.

Figure 5:
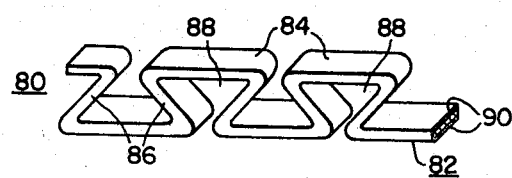
FIG. 5 is a perspective view of another configuration of a metallic duct former which may be used.

The metallic cooling ducts for performing the functions as disclosed by the teachings of this invention, may be constructed in any other suitable manner. For example, a ribbon type conductor may be bent in a predetermined configuration, which will provide the required mechanical strength, and will also provide cooling ducts when disposed between adjacent turns of a pancake coil. FIG. 5 is a perspective view of a duct forming member 80 which is constructed according to this embodiment, having a ribbon type conductor 82 bent to provide a plurality of substantially flat portions 84 on opposite sides thereof, which rest against adjacent conductor turns when disposed between the turns of the pancake coil, and having connecting angled portions 86 which define a plurality of openings 88. In this embodiment of the invention, the openings 88 which interconnect the major opposed surfaces of a pancake coil, are also partially defined by the adjacent turns of the pancake coil itself. If desired, duct forming member 80 may have a thin coating 90 of electrical insulating material disposed thereon.

Metallic duct forming members provide greater mechanical strength than the insulating duct formers of the prior art, and they also preserve the capacitive structure of the interleaved turn type high series capacitance pancake coil. The metallic duct formers, through capacitive relationships, assume substantially the same voltage as the turns they are disposed adjacent to, and if desired, they may be physically and electrically connected to an adjacent conductor turn.

It is important to note that the metallic duct forming members as well as the metallic filler strip members, do not disturb the carefully developed capacitive structure, either by reducing the capacitance of the pancake coil, such as when insulating members are used, or by increasing the capacitance of the pancake coil, such as when the principles of shielding are employed. It is just as important not to increase the capacitance at these selected points of the pancake coil, as it is to reduce the capacitance at these points, in order to prevent voltage stress concentrations in the pancake coil during a surge potential.

Pancake coils utilizing insulating duct forming members constructed according to the teachings of the prior art, and pancake coils utilizing metallic duct forming members constructed as disclosed by the teachings of this invention, were both constructed in an otherwise similar manner, and tested to determine the maximum stresses developed therein. Comparison of the test results of these two types of pancake coil constructions showed a superiority for pancake coils having the metallic duct formers. The largest turn-to-turn voltage ratios were 17% and 12% less, and the largest pancake coil to pancake coil voltage ratio was 19% less. While these reductions in the maximum stresses are the results of tests made with sinusoidal stresses at the first resonant frequency of the coils, they are an indication that surge stresses resulting from lightning or switching surges would also be reduced, resulting in pancake coils which are superior mechanically and electrically to pancake coils of the prior art which use insulating duct forming members.

In summary, the mechanical strength of a pancake coil is preserved, as well as its capacitive characteristics, by utilizing metallic filler strips and metallic duct formers, as disclosed by the invention. Therefore, filler strips and duct formers may be employed in a high series capacitance interleaved turned type pancake coil, without upsetting the desired uniformity of the capacitive structure of the pancake coil, and without introducing mechanically weak points into the coil structure.

While the metallic filler strips and metallic duct formers have been described as being used in different pancake coils, it is to be understood that both metallic filler strips and metallic duct formers may be used in the same pancake coil, if desired.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A winding for electrical inductive apparatus comprising:
   at least first and second pancake coils having first and second opposed surfaces, each of said pancake coils having at least two coil sections, the conductor turns of which are radially interleaved,
   means electrically interconnecting said coil sections and said pancake coils to provide at least one series path therethrough, with adjacent interleaved turns of said at least two coil sections in each pancake coil having different electrical positions in the winding, to increase the series capacitance thereof,
   said first and second pancake coils having substantially the same outside diameters, achieved by at least one gap disposed between predetermined adjacent conductor turns of said second pancake coil,
   and electrically conductive spacer means disposed in the gap between said predetermined adjacent turns of said second pancake coil, with said first pancake coil being free of such spacer means, said electrically conductive means having a maximum length about equal to one of said adjacent turns, and a voltage when the winding is energized which is not substantially different than one of its adjacent turns, said electrically conductive means coupling said predetermined adjacent turns of said second pancake coil to provide the gap therein while maintaining the increased series capacitance of the winding.

2. The winding of claim 1 wherein the second pancake coil includes a plurality of gaps, and a plurality of discrete conductors, each disposed in a gap, with the maximum length of each of the plurality of conductors being about equal to one of its adjacent turns.

3. The winding of claim 1 wherein the electrically conductive means is electrically connected to one of the adjacent turns in the pancake coil in which it is disposed, to clamp the voltage of the electrically conductive means to that of its selected adjacent turn.

4. The winding of claim 1 wherein the electrically conductive means includes insulating means which separates the electrically conductive means from the adjacent conductor turns.

5. The winding of claim 4 wherein the insulating means is a coating of electrical insulating means.

6. The winding of claim 1 wherein the electrically conductive means has a plurality of openings oriented to communicate between the first and second major opposed surfaces of its associated pancake coil, to provide cooling ducts through the turns of the pancake coil.

7. The winding of claim 1 wherein the electrically conductive means has a configuration which cooperates with the adjacent conductor turns to define openings which communicate between the first and second major opposed surfaces of its associated pancake coil to provide cooling ducts therein.

8. The winding of claim 1 wherein the second pancake coil includes a plurality of gaps, with electrically conductive means disposed in each of the gaps, said electrically conductive means being an insulated electrical conductor having a length substantially equal to one of its adjacent turns, each of said insulated electrical conductors providing mechanical support between its adjacent conductor turns, while defining cooling ducts which extend between the major opposed surfaces of its associated pancake coil.

9. The winding of claim 8 wherein the insulated electrical conductors are bent into a configuration which enables them to separate adjacent conductor turns of a pancake coil while defining cooling ducts which extend between the major opposed surface thereof.

10. The winding of claim 8 wherein the insulated electrical conductors are electrically connected to one of its immediately adjacent turns in the second pancake coil, to clamp the voltage of the insulated electrical conductor to that of the selected adjacent turn.

References Cited

UNITED STATES PATENTS

| | | | |
|---|---|---|---|
| 3,157,031 | 5/1939 | Stephens | 336—60X |
| 2,602,035 | 7/1952 | Camilli et al. | 336—60X |
| 2,710,947 | 6/1955 | Gaston | 336—60 |
| 2,905,911 | 9/1959 | Kurita | 336—70 |
| 3,160,838 | 12/1964 | Bedil | 336—69 |
| 3,195,084 | 7/1965 | Book | 336—60 |
| 3,327,266 | 6/1967 | Dierick | 336—70 |
| 3,380,007 | 4/1968 | Alverson et al. | 336—70 |
| 3,391,365 | 7/1968 | Tipton | 336—84X |

THOMAS J. KOZMA, Primary Examiner

U.S. Cl. X.R.

336—70